United States Patent [19]

Reiter et al.

[11] Patent Number: 4,615,244
[45] Date of Patent: Oct. 7, 1986

[54] TOOL ASSEMBLY HAVING A REPLACEABLE TOOL HEAD

[75] Inventors: Norbert Reiter, Mettmann; Hans Tack, Velbert, both of Fed. Rep. of Germany

[73] Assignee: Fried. Krupp Gesellschaft mit beschränkter Haftung, Essen, Fed. Rep. of Germany

[21] Appl. No.: 706,303

[22] Filed: Feb. 27, 1985

[30] Foreign Application Priority Data

Mar. 20, 1984 [DE] Fed. Rep. of Germany ....... 3410154

[51] Int. Cl.⁴ ............................................. B23B 29/00
[52] U.S. Cl. .................................. 82/36 B; 82/36 R; 408/239 A
[58] Field of Search .................. 82/36 R, 36 A, 36 B; 408/239 R, 239 A; 409/232, 233; 279/1 H, 1 TS, 83

[56] References Cited

U.S. PATENT DOCUMENTS

| | | | |
|---|---|---|---|
| 2,374,919 | 5/1945 | Bruseth | 409/233 |
| 3,380,326 | 4/1968 | Waddy | 82/36 R |
| 4,406,195 | 9/1983 | Krüger et al. | 82/36 B |

FOREIGN PATENT DOCUMENTS 1219304 1/1971 United Kingdom .
2094191 9/1982 United Kingdom .
3227345 1/1984 Fed. Rep. of Germany .

*Primary Examiner*—Francis S. Husar
*Assistant Examiner*—Jerry Kearns
*Attorney, Agent, or Firm*—Spencer and Frank

[57] ABSTRACT

A tool assembly includes a tool holder, a tool head and a clamping arrangement for rapidly releasably tightening the tool head to the tool holder. The clamping arrangement includes a clamping bar having a longitudinal axis and being received in the tool holder and a clamping piston connected to the clamping bar for displacement therewith. The clamping piston has first and second wedge faces arranged symmetrically to the bar axis and each defining therewith a first acute angle of at least 45°. The clamping arrangement further has first and second cams movable in a direction of motion perpendicular to the bar axis. Each cam has a camming face constituted at least in part by a surface defining, with the direction of motion of the cams, a second acute angle equalling the difference between 90° and the first acute angle. Further, a mechanism is provided for displacing the cams towards or away from one another for effecting, by camming action between the wedge faces and the camming faces, longitudinal displacements of the clamping piston and the clamping bar.

8 Claims, 7 Drawing Figures

– 1 –

TOOL ASSEMBLY HAVING A REPLACEABLE TOOL HEAD

BACKGROUND OF THE INVENTION

This invention relates to a tool assembly which comprises a tool holder and a tool head and wherein the tool head is releasably tightenable to the tool holder by means of clamping elements movable in an opening of the tool head. The clamping elements may be actuated by means of a locking bar which is slidably displaceable in the tool holder.

Tool assemblies of the above-outlined type serve for a rapid replacement or for a rapid change of the angular position of a tool head.

U.S. Pat. No. 4,406,195 issued Sept. 27, 1983 discloses a tool assembly in which, for clamping the tool head against the tool holder, a screw conically tapering towards its end is pressed against the conical outer face of a piston connected to a locking bar. Between the two conical surfaces only a linear contact occurs. Due to the required high clamping forces for the clamping bar thus either a significant wear has to be expected or expensive, wear-resistant materials have to be used. Because of the one-sided engagement of the screw with the conical surface of the piston, a torque is exerted on the components which may lead to a misalignment of these components and thus to an increased friction therebetween.

It is further known to equip the locking bar with a locking (clamping) piston which is connected with a pull rod by means of a wedge (camming) face. The pull rod, while rotation about its own axis is prevented, is moved by a non-shifting body with the intermediary of a thread pair. In such an arrangement the rotary body is exposed to significant axial frictional forces and further, frictional forces are also generated by a misalignment of the clamping piston and the pull rod.

SUMMARY OF THE INVENTION

It is an object of the invention to provide an improved tool assembly in which the efficiency of clamping is increased, thus permitting a reduction in the required clamping energy.

This object and others to become apparent as the specification progresses, are accomplished by the invention, according to which, briefly stated, the locking bar is provided with a locking piston which is equipped with two wedge faces which are arranged symmetrically to the central longitudinal axis of the locking bar and which are arranged at an acute angle $a_3$ of at least 45° with respect to the central axis. Further, the wedge faces engage camming faces of respective cams which are movable in mutually opposite directions perpendicularly to the central axis. The camming face of each cam is formed at least in part by a surface which is inclined with respect to the direction of motion of the cams at an angle $a_1$ which is the difference between a right angle and the angle $a_3$.

By arranging two wedge faces on the clamping piston and by associating them with two cams a torque-free gliding guidance of the clamping piston within the tool holder is achieved. Thus, upon rotating the clamping spindle which moves the cams, no pressing or tensioning forces are exerted on the tool holder, whereby friction forces normally generated in this manner are avoided.

According to a further feature of the invention, the acute angles $a_3$ are each between 60° and 75°. Such an angle range is advantageous for the wedge faces of the clamping piston.

According to a further feature of the invention, the wedge faces of the clamping piston are inclined at an acute angle with respect to that end of the central axis of the clamping bar which is oriented away from the tool head. This arrangement is advantageous in that a compression spring acting against the camming force of the cams may be relatively weak because it merely has to effect the disengagement of the clamping elements when the cams are pulled apart.

According to still another feature of the invention, the camming face of the cams on the end oriented towards the respective other cam includes a flat part which is inclined with respect to the direction of motion of the cams at an angle $a_2$ which is greater than the difference between 90° and the acute angle $a_3$. By virtue of this arrangement, the initial clamping motion, when only relatively small forces are generated, may occur relatively rapidly resulting in a faster completion of the clamping process.

According to further features of the invention, the cams are connected to one another by means of a threaded spindle which has two oppositely threaded length portions, each associated with a separate one of the cams. This arrangement constitutes a particularly simple mechanism for displacing the cams. According to still another feature of the invention, the threaded spindle has, between the oppositely threaded spindle portions, a cylindrical part adapted to engage into corresponding bores of the cams. This arrangement ensures that any bending moment appearing between the two elements is taken up in an advantageous manner.

DESCRIPTION OF THE PREFERRED EMBODIMENTS

Figure 1:
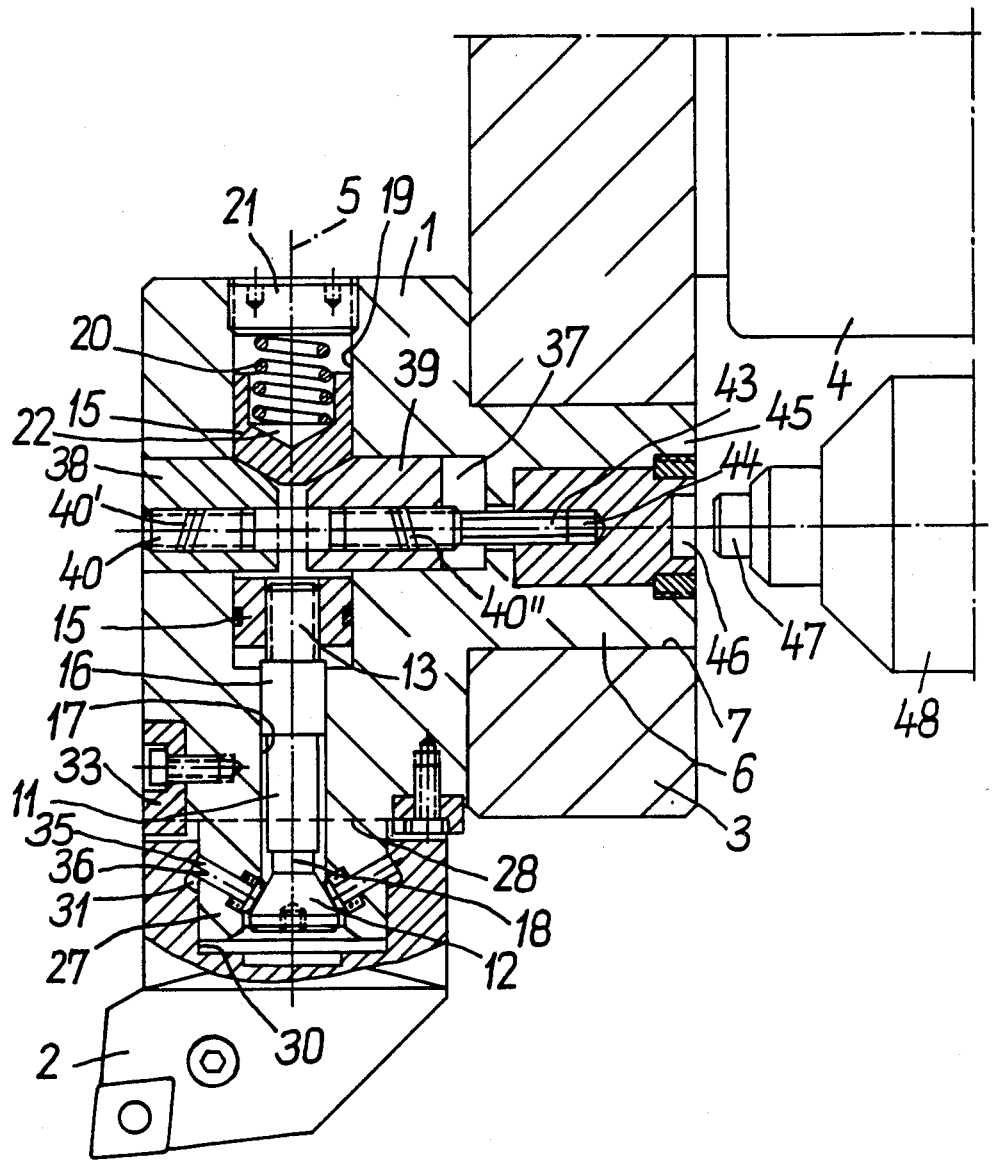
FIG. 1 is a sectional elevational view of a preferred embodiment of the invention.
Figure 2:
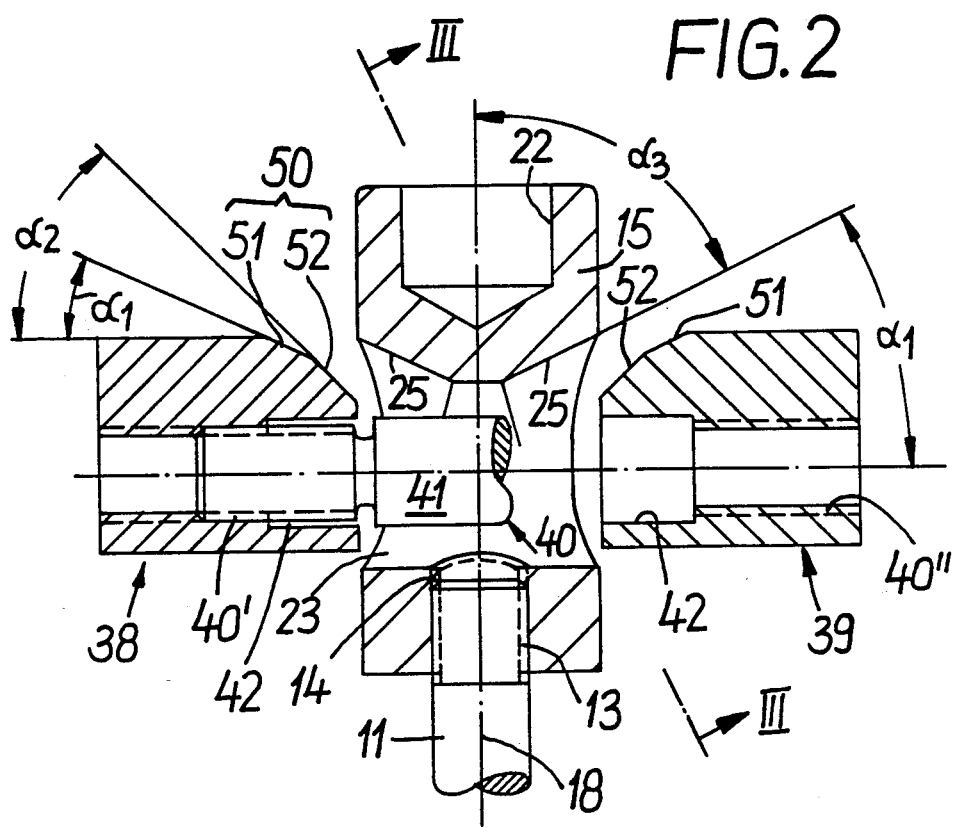
FIG. 2 is a sectional elevational view, on an enlarged scale, of some of the components of the preferred embodiment.
Figure 3:
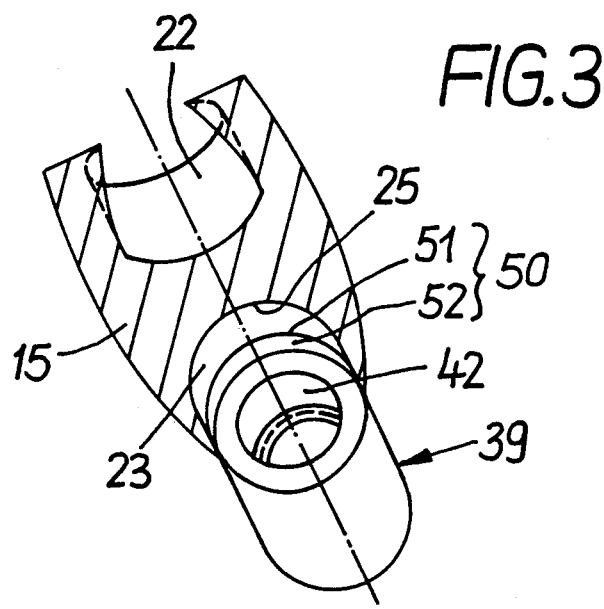
FIG. 3 is a sectional view taken along line III—III of FIG. 2.

Turning now to FIGS. 1, 2 and 3, in the embodiment shown therein, a tool assembly is provided which comprises a tool holder 1 and a tool head 2. The tool holder 1 is mounted on a turret head 3 of a machine tool 4. For this purpose, the tool holder 1 is provided, perpendicularly to its principal axis 5, with a stub shaft 6 which extends into a corresponding opening 7 of the turret head 3.

In the tool holder 1 there is longitudinally slidably arranged a clamping bar 11 which, at its end oriented towards the tool head 2, is provided with a conical enlargement 12 which flares towards the direction of the tool head 2. At its end oriented away from the tool head 2, the clamping bar 11 is provided with a thread 13 which engages in a corresponding inner thread 14 of a clamping piston 15, also longitudinally slidably received in the tool holder 1. The bar 11 further has a cylindrical mid portion 16 which is slidingly guided in a corresponding bore 17 provided in the tool holder 1. The principal axis 5 of the tool holder 1 coincides with the central axis 18 of the clamping bar 11.

The piston 15 is slidably supported in a cylindrical cavity 19 of the tool holder 1 coaxially with the central axis 18 of the clamping bar 11 and is, by means of a compression spring 20, urged in the direction of the tool head 2. The compression spring 20 engages, with one end, a threaded disc 21 screwed into the tool holder 1 and, with its other end, projects into a recess 22 provided in the piston 15. The latter has a central passage 23 which extends transversely to the axis 18 and whose inner walls remote from the tool head 2 form two wedge faces 25, each of which defines an acute angle $\alpha_3$ of approximately 65° with that end of the central axis 18 which is oriented away from the tool head 2.

Figure 6:
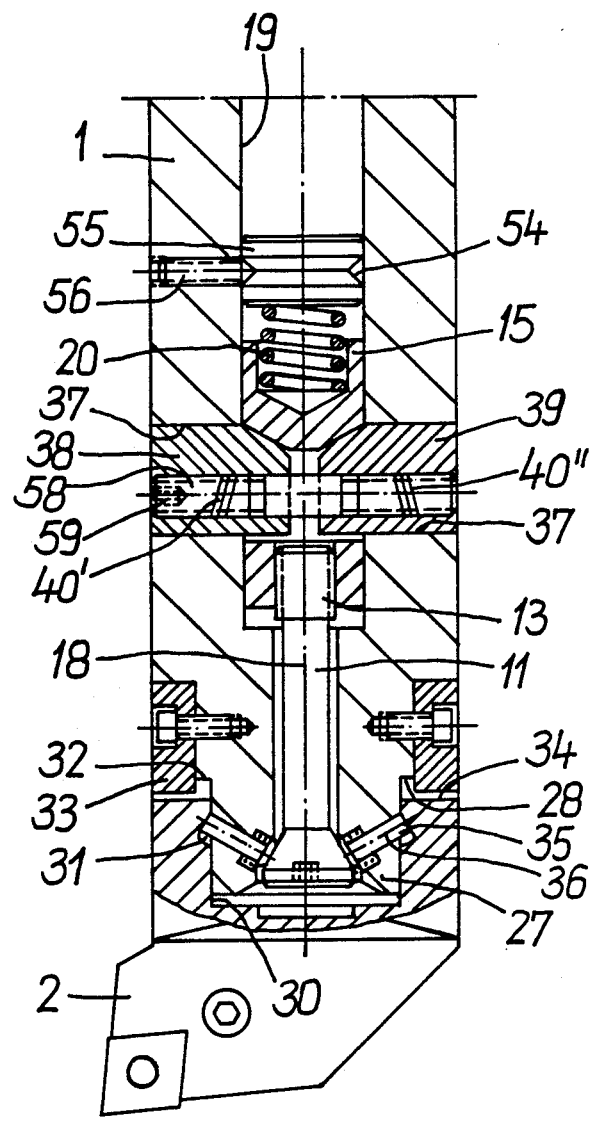
FIG. 6 is a sectional elevational view of still another embodiment of the invention.

The tool holder 1 further has a cylindrical receiving stub 27 having an annular engagement face (shoulder) 28 (also shown in FIG. 6). The tool head 2 is provided with a corresponding cylindrical recess 30 which has an inner groove 31 and a corresponding annular engagement face 32 for the axial immobilization of the tool head 2 on the tool holder 1. For determining the angular position of the tool head 2 on the tool holder 1 the latter is provided on its circumferential surface with a guide tongue 33 which projects into a corresponding recess 34 provided in the tool head 2.

In the tool holder 1 clamping pins 35 are supported perpendicularly to the respective generatrix of the conical enlargement 12 of the clamping bar 11. The clamping pins 35 are longitudinally slidable parallel to their axes 36 and are urged by respective springs (not shown) against the conical enlargement 12 of the clamping bar 11.

Perpendicularly to the opening 19 of the piston 15, that is, perpendicularly to the central axis 18 of the clamping bar 11, the tool holder 1 has a passage 37 which receives two cams 38 and 39 connected to one another by means of a threaded spindle 40. The latter projects into the cam 38 with a left-hand thread 40' and extends into the cam 39 with a right-hand thread 40". The threads 40', 40" may be trapezoidal threads. The threaded spindle 40 is provided in its mid portion with a cylindrical part 41 which is adapted to project, with a close fit, into respective bores 42 of the cams 38 and 39. Further, the spindle 40 has a continuation 43 which is of non-circular cross section and which extends into a similarly shaped opening 44 of an intermediate piece 45 rotatably supported in the stub shaft 6. At its other end the intermediate piece 45 is provided with a non-circular opening 46 into which may project a correspondingly shaped driving pin 47 of a hydraulic driver 48 which is movable relative to the turret head 3.

Each camming face 50 of the cams 38 and 39 has a first partial face 51 which extends at an angle $\alpha_1$, with respect to the direction of motion of the cams. The angle $\alpha_1$ corresponds to an angle (90°−$\alpha_3$). The partial face 51 thus extends parallel to the respective wedge face 25 of the piston 15. The partial faces 51 are adjoined, in the direction of the respective other cam, by a further partial face 52 which extends at an angle $\alpha_2$ with respect to the direction of motion of the cams. The angle $\alpha_2$ is larger than the angle $\alpha_1$. The wedge faces 25 and the partial faces 51, 52 of the camming faces 50 of the cams 38 and 39 are rounded as illustrated in FIG. 3. It is, however, feasible to provide flat surfaces for these components.

Figure 4:
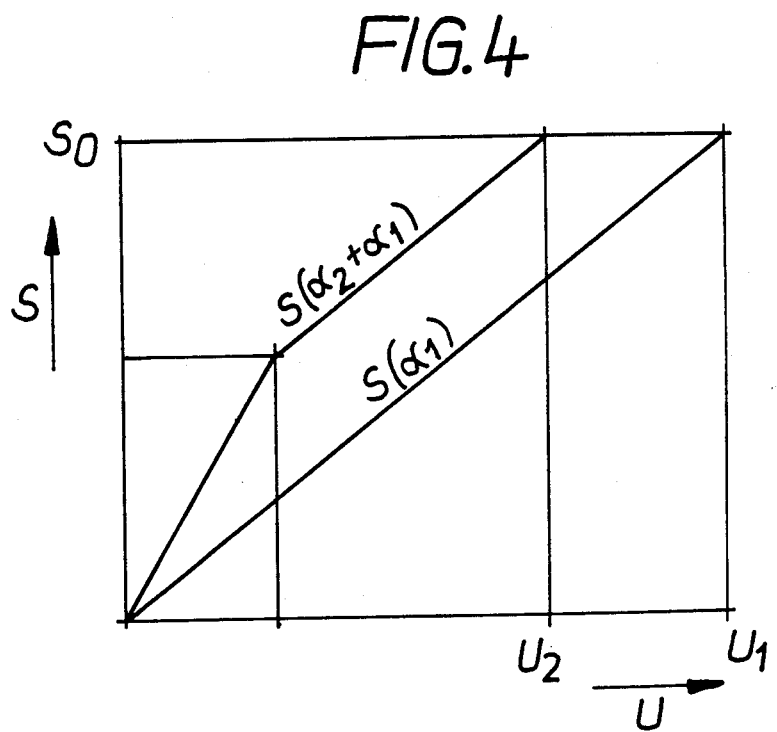
FIG. 4 is a diagram illustrating functions between displacements of several components of the preferred embodiment.

Turning now to FIG. 4, the curve s ($\alpha_1$) represents the clamping path (stroke) of the piston 15 and the clamping bar 11 in case the cams 38 and 39 have a single unitary camming face which, in each instance, extends parallel to the respective wedge face 25 of the piston 15. In such an arrangement a stroke $s_0$ is obtained after $U_1$ revolutions of the threaded spindle 40.

If the camming face 50 of the cams 38 and 39 is formed of two partial faces 51 and 52 (FIG. 2), such camming face is represented by curve s ($\alpha_2+\alpha_1$) formed of two straight lines. One of the lines is parallel to the curve s ($\alpha_1$). As a result of the greater slope of the partial surface 52 situated adjacent the respectively opposite cam, the piston 15 is moved faster in the stroke range in which relatively small forces need to be transmitted, so that the stroke $s_0$ is reached after a number of revolutions $U_2$ of the threaded spindle 40 which is less than the number of revolutions $U_1$, required for obtaining the stroke $s_0$ in case of cams with single camming faces.

Figure 5:
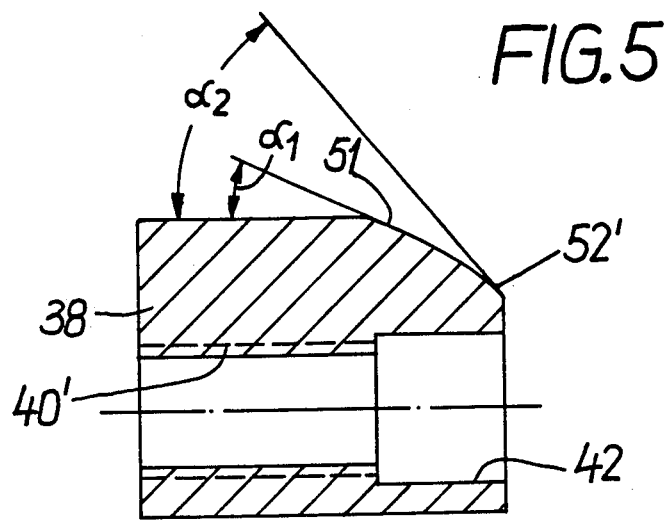
FIG. 5 is a sectional elevational view of a component according to another preferred embodiment of the invention.

Turning now to the embodiment illustrated in FIG. 5, the camming face of the cam 38 has at its upper end a partial surface 51 which has an angle $\alpha_1$ to the direction of motion of the cam and thus extends parallel to the wedge face 25 of the piston 15. In its frontal or deeper zone the camming face changes by a curvature into a planar zone 52' which is inclined at an angle $\alpha_2$ to the direction of motion of the cam. The angle $\alpha_2$ is greater than the angle $\alpha_1$.

For releasing the tool head 2, the drive pin 47 of the power driver 48 is inserted into the opening 46 of the intermediate component 45. By means of a clockwise rotation of the spindle 40, the two cams 38 and 39 are moved away from one another, so that the piston 15, aided by the force of the compression spring 20, moves towards the tool head 2. As a result, the conical enlargement 12 of the clamping bar 11 is also lowered, so that the clamping pins 35 which heretofore have projected into the inner groove 31 of the tool head 2, move outwardly in the direction of the central axis 18 of the clamping bar 11. In this manner the tool head 2 is released and it thus may be pulled off the tool holder 1 in order to re-insert it in another angular position or to replace it with another tool head.

For re-clamping the tool head 2 in the tool holder 1, the threaded spindle 40 is turned counterclockwise by means of the power driver 48, whereupon the cams 38 and 39 move towards one another, penetrate from both sides into the central passage 23 provided in the piston 15 and, by camming engagement with the wedge faces 23 situated within the passage 23, press the piston 15 and the clamping bar 11 upwardly. The conical enlargement 12 of the clamping bar 11 presses the clamping pins 35 into their outer position, causing them to project into the inner groove 31 of the tool head 2 to thus clamp the tool head 2 to the tool holder 1.

Turning now to the embodiment illustrated in Figure 6, the tool holder 1 is constituted by a drill rod type structure where the compression spring 20 is in engagement with a piston 55 which is provided with a circumferential groove 54 and which is supported by at least one threaded pin 56 arranged radially in the tool holder 1. In this embodiment the threaded spindle 58 has an external hexagonal recess 59 into which may be fitted a driver operated by manual force or by pneumatic or hydraulic power for rotating the threaded spindle 58.

Figure 7:
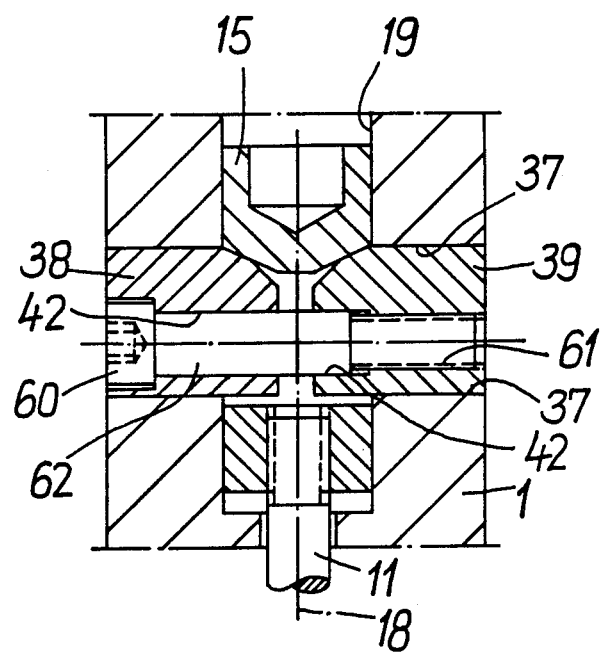
FIG. 7 is a sectional elevational view of a component of a further preferred embodiment of the invention.

In the embodiment according to FIG. 7, the cams 38, 39 are shifted towards or away from one another by a head screw 60 which threadedly engages, with a thread 61, only the cam 39. With its cylindrical mid portion 62 the head screw 60 extends into corresponding bores 42 of the wedges 38 and 39.

It is to be understood that the invention is not limited to the embodiments described; thus, the adjustment of the cams 38, 39 may be effected, for example, by hydraulic or pneumatic means.

It will be understood that the above description of the present invention is susceptible to various modifications, changes and adaptations, and the same are intended to be comprehended within the meaning and range of equivalents of the appended claims.

What is claimed is:

1. In a tool assembly including a tool holder, a tool head and clamping means accommodated in said tool holder for rapidly releasably tightening the tool head to the tool holder; said clamping means including a clamping bar having a longitudinal axis and being received in said tool holder for sliding motion parallel to said axis; said clamping bar having a clamping position and a releasing position spaced from said clamping position parallel to said axis; the improvement wherein said clamping means comprises (a) a clamping position connected to said clamping bar for displacement therewith; said clamping piston having a throughgoing central passage extending perpendicularly to said axis; said clamping piston further having, within said passage, first and second wedge faces arranged symmetrically to said axis and each defining with said axis a first acute angle of at least 45°;

(b) first and second cams movable in a direction of motion perpendicular to said axis into and out of said passage; each cam having a camming face constituted at least in part by a surface defining, with said direction of motion of the cams, a second acute angle equalling the difference between 90° and said first acute angle; said cams being arranged to effect contact between the camming face of the first cam and the first wedge face and between the camming face of the second cam and the second wedge face; and (c) moving means for displacing said cams towards or away from one another for effecting, by camming action between the wedge faces and the camming face, a longitudinal displacement of the clamping piston and the clamping bar.

2. A tool assembly as defined in claim 1, wherein said first acute angle is between 60° and 75°, inclusive.

3. A tool assembly as defined in claim 1, wherein said first acute angle is defined by each wedge face and a direction of said axis pointing away from said tool head.

4. A tool assembly as defined in claim 3, wherein the camming face of each can has a terminal face portion closest to a respective other cam; said terminal face portion defining, with said direction of motion of the cams, a third acute angle greater than said second acute angle.

5. A tool assembly as defined in claim 1, wherein said moving means comprises a threaded bolt interconnecting said cams.

6. A tool assembly as defined in claim 5, wherein said threaded bolt threadedly engages said cams with threads of opposite pitch.

7. A tool assembly as defined in claim 6, wherein said threaded bolt comprises a cylindrical portion between said threads of opposite pitch; each said cam having a bore hole dimensioned to receive said cylindrical portion with a close fit.

8. A tool assembly as defined in claim 1, wherein said passage is defined by inner wall portions of said piston, and further wherein said wedge faces are constituted by some of said wall portions.

* * * * *